United States Patent
Hara et al.

(10) Patent No.: US 12,421,416 B2
(45) Date of Patent: Sep. 23, 2025

(54) LIQUID REPELLENT COMPOSITION, METHOD FOR PRODUCING SAME, AND ARTICLE

(71) Applicant: AGC Inc., Tokyo (JP)

(72) Inventors: Hiroyuki Hara, Tokyo (JP); Motohiro Takemura, Tokyo (JP); Yuzuka Kamijo, Tokyo (JP)

(73) Assignee: AGC Inc., Tokyo (JP)

( * ) Notice: Subject to any disclaimer, the term of this patent is extended or adjusted under 35 U.S.C. 154(b) by 835 days.

(21) Appl. No.: 17/655,301

(22) Filed: Mar. 17, 2022

(65) Prior Publication Data

US 2022/0204803 A1    Jun. 30, 2022

Related U.S. Application Data

(63) Continuation of application No. PCT/JP2020/038488, filed on Oct. 12, 2020.

(30) Foreign Application Priority Data

Oct. 24, 2019    (JP) ................. 2019-193655

(51) Int. Cl.
    *C09D 127/12*    (2006.01)
    *C08F 214/18*    (2006.01)
    *C09D 5/02*      (2006.01)
    *C09D 7/45*      (2018.01)

(52) U.S. Cl.
    CPC ........ *C09D 127/12* (2013.01); *C08F 214/186* (2013.01); *C09D 5/022* (2013.01); *C09D 7/45* (2018.01)

(58) Field of Classification Search
    CPC ...... B05D 5/083; B05D 1/18; B05D 2203/35; B05D 2256/00; B05D 2401/20; B05D 2401/31; C03C 25/305; C03C 17/328; C03C 2217/76; C08F 2/28; C08F 2/30; C08F 214/182; C08F 214/186; C08F 216/1416; C08F 218/08; C08F 218/10; C08F 290/062; C09D 127/12; C09D 5/022; C09D 5/027; C09D 7/45; C09K 3/18

See application file for complete search history.

(56) References Cited

U.S. PATENT DOCUMENTS

| | | | |
|---|---|---|---|
| 2013/0149543 A1 | 6/2013 | Yamane et al. | |
| 2015/0064490 A1 | 3/2015 | Yamane et al. | |
| 2020/0270439 A1* | 8/2020 | Hara | D06M 15/3562 |

FOREIGN PATENT DOCUMENTS

| | | |
|---|---|---|
| CN | 106380948 A | 2/2017 |
| CN | 111349372 A | 6/2020 |
| WO | WO 2012/020735 A1 | 2/2012 |
| WO | WO 2015/111668 A1 | 7/2015 |
| WO | WO 2019/138680 A1 | 7/2019 |

OTHER PUBLICATIONS

International Search Report issued Dec. 15, 2020 in PCT/JP2020/038488, filed on Oct. 12, 2020, 2 pages.

* cited by examiner

*Primary Examiner* — Ana L. Woodward
(74) *Attorney, Agent, or Firm* — Oblon, McClelland, Maier & Neustadt, L.L.P.

(57) ABSTRACT

A liquid repellent composition which can provide an article with good alcohol repellency is provided. A liquid repellent composition comprising a fluorinated polymer and an aqueous medium, wherein the fluorinated polymer comprises units based on a monomer a, units based on a monomer b and units based on a monomer c. Monomer a: a compound represented by $CH_2=CH-R^f$ (wherein $R^f$ is a $C_{1-8}$ perfluoroalkyl group). Monomer b: a fluorine-free nonionic surfactant having a polymerizable carbon-carbon double bond. Monomer c: another monomer copolymerizable with the monomer a and the monomer b.

11 Claims, No Drawings

LIQUID REPELLENT COMPOSITION, METHOD FOR PRODUCING SAME, AND ARTICLE

TECHNICAL FIELD

The present invention relates to a liquid repellent composition, a method for its production and an article.

BACKGROUND ART

As a way to impart water/oil repellency to the surface of an article such as textile products, treatment of the article with a water/oil repellent composition comprising a fluorinated polymer comprising units based on a (meth)acrylate having a perfluoroalkyl group is known. However, the ester linkage in units based on the (meth)acrylate easily breaks upon alkaline hydrolysis. Therefore, the water/oil repellency of an article can wane as the fluorinated polymer loses perfluoroalkyl groups that way.

A water/oil repellent composition comprising a fluorinated polymer having no units based on a (meth)acrylate having a perfluoroalkyl group is known to impart alkali-resistant water/oil repellency to an article. As fluorinated polymers comprising no units based on a (meth)acrylate having a perfluoroalkyl group, for example, fluorinated polymers comprising units based on a (perfluoroalkyl)ethylene are known (Patent Document 1).

Meanwhile, introduction of units based on a reactive emulsifier into a fluorine-free polymer is proposed to improve the emulsion stability of the fluorine-free polymer (Patent Document 2).

PRIOR ART DOCUMENTS

Patent Documents

Patent Document 1: WO2019/138680
Patent Document 2: WO2015/111668

DISCLOSURE OF INVENTION

Technical Problem

However, an article treated with a water/oil repellent composition comprising the fluorinated polymer does not repel alcohols sufficiently.

The fluorine-free polymer described in Patent Document 2 contains no fluorine and hence cannot impart alcohol repellency.

The present invention provides a liquid repellent composition which can provide an article with high alcohol repellency, a method for producing it, and an article with high alcohol repellency.

Solution to Problem

The present invention provides the following aspects.

[1] A liquid repellent composition comprising a fluorinated polymer and an aqueous medium wherein the fluorinated polymer comprises units based on the following monomer a, units based on the following monomer b and units based on the following monomer c:

monomer a: a compound represented by the following formula (1):

$$CH_2=CH-R^f \quad (1)$$

wherein $R^f$ is a $C_{1-8}$ perfluoroalkyl group,
monomer b: a fluorine-free nonionic surfactant having a polymerizable carbon-carbon double bond, and
monomer c: another monomer copolymerizable with the monomer a and the monomer b.

[2] The liquid repellent composition according to [1], wherein the ratio of units based on the monomer b to the sum of units based on the monomer a and units based on the monomer c is from 0.5 to 5 mass %.

[3] The liquid repellent composition according to [1] or [2], wherein the ratio of units based on the monomer a to the sum of units based on the monomer a and units based on the monomer c is from 60 to 80 mass %.

[4] The liquid repellent composition according to any one of [1] to [3], wherein $R^f$ in the formula (1) is a $C_{1-6}$ perfluoroalkyl group.

[5] The liquid repellent composition according to any one of [1] to [4], wherein the monomer b is a compound represented by the following formula (2):

$$CH_2=CR^1-R^2-O-R^3-H \quad (2)$$

wherein $R^1$ is a hydrogen atom or a methyl group, $R^2$ is a $C_{1-6}$ alkylene group, and $R^3$ is a bivalent group having a polyoxyalkylene chain (having a carbon atom bonded to the neighboring $CH_2=CR^1-R^2-O-$).

[6] The liquid repellent composition according to any one of [1] to [5], wherein the monomer c comprises a compound represented by $CH_2=CH-Q$ or $CH_2=CHCH_2-Q$ (wherein Q is a halogen atom or an organic group having an oxygen, nitrogen or sulfur atom bonded to the neighboring vinyl or allyl group).

[7] The liquid repellent composition according to any one of [1] to [6], wherein the fluorinated polymer has a number average molecular weight of from 10,000 to 100,000.

[8] The liquid repellent composition according to any one of [1] to [7], wherein the fluorinated polymer is dispersed in the aqueous medium as emulsion particles.

[9] The liquid repellent composition according to [8], wherein the emulsion particles of the fluorinated polymer have an average particle diameter of from 20 to 200 nm.

[10] The liquid repellent composition according to any one of [1] to [9], which further comprises a cationic surfactant.

[11] A method for producing a liquid repellent composition, which comprises polymerizing a monomer component in an emulsion comprising an aqueous medium, the monomer component and a polymerization initiator to obtain a liquid repellent composition comprising the aqueous medium and a fluorinated polymer, wherein the monomer component comprises the following monomer a, the following monomer b and the following monomer c:

monomer a: a compound represented by the following formula (1):

$$CH_2=CH-R^f \quad (1)$$

wherein $R^f$ is a $C_{1-8}$ perfluoroalkyl group,
monomer b: a fluorine-free nonionic surfactant having a polymerizable carbon-carbon double bond, and
monomer c: another monomer copolymerizable with the monomer a and the monomer b.

[12] An article treated with the liquid repellent composition as defined in any one of [1] to [10].

ADVANTAGEOUS EFFECTS OF INVENTION

The liquid repellent composition of the present invention can provide an article with high alcohol repellency.

The method for producing a liquid repellent composition of the present invention can produce a liquid repellent composition which can provide an article with high alcohol repellency.

The article of the present invention has high alcohol repellency.

DESCRIPTION OF EMBODIMENTS

The terms used in the present invention have the following meanings and definitions.

A "unit based on a monomer" is a generic term for an atomic group derived from 1 molecule of the monomer by polymerization directly, or by polymerization and subsequent partial chemical modification.

A "(meth)acrylate" is a generic term for an acrylate and a methacrylate. Similarly, a "(meth)acryloyloxy group" is a generic term for an acryloyloxy group and a methacryloyloxy group.

The average particle diameter of emulsion particles of a polymer is calculated by cumulant analysis of an autocorrelation function measured by dynamic light scattering of a sample obtained by diluting a liquid repellent composition with water to a solid content of 1 mass %.

The number average molecular weight (hereinafter referred to as "Mn") and mass average molecular weight (hereinafter referred to as "Mw") of a polymer are polymethyl methacrylate equivalent molecular weights measured by gel permeation chromatography (hereinafter referred to as "GPC") from a calibration curve obtained using polymethyl methacrylate standards.

A solid content is calculated as (solid mass/sample mass)×100, wherein the sample mass is the mass of a sample before heating, and the solid mass is the mass of the sample after 4 hours of heating at 120° C. in a convection dryer.

A numerical range expressed by using "to" includes the figures before and after "to" as the lower limit and the upper limit.

[Liquid Repellent Composition]

The liquid repellent composition of the present invention (hereinafter referred to as "the present composition") comprises a specific fluorinated polymer (hereinafter referred to as "polymer A") and an aqueous medium.

The present composition is preferably a polymer dispersion comprising the polymer (A) and an aqueous medium.

The present composition means both a dispersion obtained by the method of the present invention for producing the polymer (A), which will be described later, and a dispersion obtained by diluting the dispersion with any aqueous medium before treatment of an article.

The present composition may comprise a surfactant other than the monomer b (hereinafter referred to as "additional surfactant"), if necessary.

The present composition may comprise additional components, if necessary.

(Polymer (A))

The polymer (A) comprises units (hereinafter referred to as "units a") based on the monomer a, units (hereinafter referred to as "units b") based on the monomer b and units (hereinafter referred to as "units c") based on the monomer c.

monomer a: a compound represented by the following formula (1)

$$CH_2=CH-R^f \quad (1)$$

wherein $R^f$ is a $C_{1-8}$ perfluoroalkyl group, monomer b: a fluorine-free nonionic surfactant having a polymerizable carbon-carbon double bond, and monomer c: another monomer copolymerizable with the monomer a and the monomer b.

$R^f$ in the monomer a preferably has from 1 to 6 carbon atoms, more preferably from 4 to 6 carbon atoms, particularly preferably 6 carbon atoms, in view of high conversion rate to the polymer (A), availability of the raw materials and ease of handling.

$R^f$ is preferably linear.

As the monomer a, for example, $CH_2=CH-CF_3$, $CH_2=CH-CF_2CF_3$, $CH_2=CH-CF_2CF_2CF_3$, $CH_2=CH-CF(CF_3)_2$, $CH_2=CH-(CF_2)_3CF_3$, $CH_2=CH-CF_2CF(CF_3)_2$, $CH_2=CH-C(CF_3)_3$, $CH_2=CH-(CF_2)_4CF_3$, $CH_2=CH-CF_2CF_2CF(CF_3)_2$, $CH_2=CH-(CF_2)_5CF_3$, $CH_2=CH-(CF_2)_5CF(CF_3)_2$ and $CH_2=CH-(CF_2)_7CF_3$ may be mentioned.

As the monomer a, $CH_2=CH-CF_3$, $CH_2=CH-CF_2CF_3$, $CH_2=CH-CF(CF_3)_2$, $CH_2=CH-(CF_2)_3CF_3$ and $CH_2=CH-(CF_2)_5CF_3$ are preferred, $CH_2=CH-CF_3$, $CH_2=CH-CF_2CF_3$, $CH_2=CH-(CF_2)_3CF_3$ and $CH_2=CH-(CF_2)_5CF_3$ are more preferred, and $CH_2=CH-(CF_2)_3CF_3$ and $CH_2=CH-(CF_2)_5CF_3$ are further preferred.

Two or more monomers a may be used in combination.

The monomer b may be any compound that has a polymerizable carbon-carbon double bond and functions as a fluorine-free nonionic surfactant.

The monomer b preferably has an HLB (Hydrophilic-Lipophilic Balance) value of from 11 to 18, more preferably from 12 to 17.

The HLB value is measured by Griffin's method.

The monomer b may, for example, be a compound having a polymerizable carbon-carbon double bond and a polyoxyalkylene (hereinafter referred to as "POA") chain.

The POA chain is represented as -(AO)$_m$— wherein "AO" is an oxyalkylene group, and m is an integer of at least 2. Each AO in -(AO)$_m$— may be the same or different.

The oxyalkylene group represented as AO is preferably a $C_{2-6}$ oxyalkylene group, particularly preferably an oxyethylene group, an oxypropylene group, an oxybutylene group or an oxytetramethylene group.

m is preferably from 2 to 80, more preferably from 3 to 60, further preferably from 3 to 30 in order to bring the HLB value of the monomer b within an appropriate range.

When the POA chain comprises two or more kinds of AO containing different numbers of carbon atoms, the AO's may be bonded in any order in blocks or randomly. For example, when the POA chain consists of oxyethylene groups and oxypropylene groups, the oxyethylene groups and the oxypropylene groups may be arranged randomly, alternately or into at least one oxyethylene block and at least one oxypropylene block bonded together.

When the POA chain comprises two or more kinds of AO, preferred AO combinations are the combination of oxyethylene groups and oxypropylene groups, the combination of oxyethylene groups and oxybutylene groups and the combination of oxyethylene groups and oxytetramethylene groups.

The monomer b is preferably a compound represented by the following formula (2) for its high copolymerizability with the monomer a.

$$CH_2=CR^1-R^2-O-R^3-H \quad (2)$$

wherein $R^1$ is a hydrogen atom or a methyl group, $R^2$ is a $C_{1-6}$ alkylene group, and $R^3$ is a bivalent group containing a POA chain (which has a carbon atom bonded to the neighboring $CH_2$=$CR'$—$R^2$—O—).

$R^2$ preferably comprises two or three carbon atoms. $R^2$ is preferably linear.

The POA chain in $R^3$ is the same as described above. It is preferred that $R^3$ itself is a POA chain. Two or more monomers b may be used in combination.

The monomer c preferably comprises a compound represented by $CH_2$=CH-Q or $CH_2$=$CHCH_2$-Q (hereinafter referred to as "monomer c1") wherein Q is a halogen atom or an organic group having an oxygen, nitrogen or sulfur atom as the atom bonded to the neighboring vinyl or allyl group (hereinafter referred to as "bond terminal atom").

The organic group having an oxygen, nitrogen or sulfur atom as the bond terminal atom may, for example, be —$OR^4$, —OC(=O)$R^4$, —$NHR^4$, —$NR^4R^5$, —$SR^4$ or a nitrogen-containing heterocyclic group containing a ring-constituting nitrogen atom as the bond terminal atom, wherein each of $R^4$ and $R^5$ is independently an alkyl group, a cycloalkyl group, an aryl group or a heterocyclic group. The alkyl group comprises, for example, from 1 to 22 carbon atoms. The cycloalkyl group comprises, for example, from 3 to 8 ring-constituting carbon atoms.

The organic group as Q may comprise a reactive group such as a hydroxy group, a carboxy group, an amino group or an alkylamino group or a halogen atom, and may comprise a linking group such as an ethereal oxygen atom a carbonyloxy group or a carbonyl group which does not contain the bond terminal atom. It may further comprise a polymerizable carbon-carbon double bond. The reactive group is preferably a hydroxy group, and it is preferred that the organic group has no polymerizable carbon-carbon double bonds.

The compound represented by $CH_2$=CH-Q is preferably a vinyl carboxylate, a vinyl ether or a vinyl halide. The vinyl ether is preferably an alkyl vinyl ether or a hydroxyalkyl vinyl ether.

The compound represented by $CH_2$=$CHCH_2$-Q is preferably an allyl carboxylate, an allyl ether or an allyl halide. The allyl ether is preferably an alkyl allyl ether or a hydroxyalkyl allyl ether.

The acyl group in the vinyl carboxylate or the allyl carboxylate preferably has at most 24 carbon atoms, more preferably from 2 to 6 carbon atoms. It is also preferred to use a vinyl or allyl carboxylate having a $C_{2-6}$ acyl group and a vinyl or allyl carboxylate having a $C_{10-22}$ acyl group in combination.

The alkyl or hydroxyalkyl in the alkyl vinyl ether, the hydroxyalkyl vinyl ether, the alkyl allyl ether and the hydroxyalkyl allyl ether preferably has from 2 to 6 carbon atoms.

The vinyl carboxylate may, for example, be vinyl acetate, vinyl butyrate, vinyl pivalate, vinyl caproate, vinyl caprylate, vinyl laurate, vinyl stearate, vinyl benzoate, vinyl chloroacetate or divinyl adipate. As the vinyl carboxylate, vinyl acetate is particularly preferred in view of production of an article with high oil repellency and alcohol repellency.

The vinyl ether may, for example, be methyl vinyl ether, ethyl vinyl ether, n-butyl vinyl ether, iso-butyl vinyl ether, tert-butyl vinyl ether, 2-hydroxyethyl vinyl ether, 4-hydroxybutyl vinyl ether, stearyl vinyl ether, chloromethyl vinyl ether, 2-chloroethyl vinyl ether, chloropropyl vinyl ether, cyclohexyl vinyl ether, ethylene glycol monovinyl ether or diethylene glycol monovinyl ether.

The vinyl halide may, for example, be vinyl chloride or vinyl fluoride.

The allyl carboxylate may, for example be allyl acetate or diallyl adipate.

The allyl ether may, for example be allyl ethyl ether, diallyl ether, 1,3-diallyloxy-2-propanol and ethylene glycol monoallyl ether.

The allyl halide may, for example, be allyl chloride or allyl fluoride.

Other examples of the compound represented by $CH_2$=CH-Q or $CH_2$=$CHCH_2$-Q include N-vinylpyrrolidone, N-vinyl-ε-caprolactam and ethyl vinyl sulfide.

The monomer c1 is preferably a vinyl carboxylate, an allyl carboxylate, an alkyl vinyl ether, an alkyl allyl ether, a hydroxyalkyl vinyl ether, a hydroxyalkyl allyl ether, a vinyl halide or an allyl halide, more preferably a vinyl carboxylate or a vinyl halide, in view of copolymerizability with the monomer a and production of an article with high oil and alcohol repellency.

Specifically speaking, the monomer c1 is preferably vinyl acetate, vinyl butyrate, vinyl pivalate, vinyl caprylate, vinyl laurate, vinyl stearate, vinyl benzoate, vinyl chloroacetate, ethyl vinyl ether, tert-butyl vinyl ether, 4-hydroxybutyl vinyl ether, ethylene glycol monoallyl ether, vinyl chloride or vinyl fluoride, more preferably vinyl acetate, in view of production of an article with high oil and alcohol repellency.

The polymer (A) may comprise units based on a monomer c other than the monomer c1, which will be referred to as a monomer c2, as units c.

The polymer preferably comprise units based on the monomer c1 only, or units based on the monomer c1 and units based on the monomer c2, as units c.

The polymer (A) may comprise, units based on two or more monomers c1. When the polymer (A) comprises units based on a monomer c2, it may comprises units based on two or more monomers c2.

The monomer c2 may, for example, be an olefin, a haloolefin other than vinyl halides, an alkyl (meth)acrylate, a hydroxyalkyl (meth)acrylate, a fluoroalkyl (meth)acrylate or a perfluoro(alkyl vinyl ether). Specifically speaking, it may be ethylene, propylene, vinylidene chloride, vinylidene fluoride, tetrafluoroethylene, methyl (meth)acrylate, ethyl (meth)acrylate, stearyl (meth)acrylate, behenyl (meth)acrylate, isobornyl (meth)acrylate, 2-hydroxyethyl (meth)acrylate, 2-[(3,5-dimethylpyrazolyl)carbonylamino]ethyl (meth) acrylate, N-methylolacrylamide, 2-perfluorohexylethyl (meth)acrylate, $CF_2$=$CFOCF_3$, $CF_2$=$CFOCF_2CF_3$, $CF_2$=$CFOCF_2CF_2CF_3$, $CF_2$=$CFOCF_2CF_2CF_2CF_3$ or $CF_2$=$CFOCF_2CF(CF_3)OCF_2CF_2CF_3$.

The monomer c2 is preferably a (meth)acrylate. However, the polymer (A) is preferred to comprise no units based on a (meth)acrylate having a perfluoroalkyl group, in view of production of an article with more alkali-resistant water, oil and alcohol repellency. Therefore, as the monomer c2, preferred is a fluorine-free (meth)acrylate such as methyl (meth)acrylate, n-butyl (meth)acrylate, tert-butyl (meth) acrylate, 2-hydroxyethyl (meth)acrylate, lauryl (meth)acrylate, stearyl (meth)acrylate or behenyl (meth)acrylate. n-Butyl (meth)acrylate and 2-hydroxyethyl (meth)acrylate are preferred for production of a polymer (A) with a low glass transition temperature (Tg) having good film-forming properties, and lauryl (meth)acrylate, stearyl (meth)acrylate and behenyl (meth)acrylate are preferred for production of a textile article with a good texture and higher water repellency.

The ratio of units based on the monomer b to the sum of units based on the monomer a and units based on the monomer c is preferably from 0.5 to 5 mass %, more preferably from 0.6 to 4 mass %. When the ratio of units b is not lower than the above-mentioned lower limit, the polymer (A) shows good dispersibility in an emulsion, forming emulsion particles with a proper average diameter. When the ratio of units b is not higher than the above-mentioned upper limit, the present composition can provide an article with higher alcohol repellency.

All the units constituting the polymer (A) means the sum of units a, units b and units c.

In the polymer (A), the ratio of units a to the sum of units a and units c is preferably from 60 to 80 mass %, more preferably from 62 to 78 mass %. When the ratio of units a is not lower than the above-mentioned lower limit, the present composition can provide an article with higher oil and alcohol repellency. When the ratio of units a is not higher than the above-mentioned upper limit, the conversion rate to the polymer (A) during the polymerization tends to be high.

The ratio of units a to all the units constituting the polymer (A) is preferably from 57 to 80 mass %, more preferably from 60 to 80 mass %, further preferably from 62 to 78 mass %. The lower limit for the ratio of units a is preferably 57 mass %, more preferably 60 mass %, further preferably 62 mass %. When the ratio of units a is not lower than the above-mentioned lower limit, the present composition can provide an article with higher oil and alcohol repellency. The upper limit for the ratio of units a is preferably 80 mass %, more preferably 78 mass %. When the ratio of units a is not higher than the above-mentioned upper limit, the conversion rate to the polymer (A) during the polymerization tends to be high.

The ratio of units b to all the units constituting the polymer (A) is preferably from 0.5 to 5 mass %, more preferably from 0.7 to 4 mass %. The lower limit for the ratio of units b is preferably 0.48 mass %, more preferably 0.5 mass %, further preferably 0.7 mass %. When the ratio of units b is not lower than the above-mentioned lower limit, the polymer (A) shows good dispersibility in an emulsion, forming emulsion particles with a proper average diameter. The upper limit for the ratio of units b is preferably 5 mass %, more preferably 4.98 mass %, further preferably 4 mass %. When the ratio of units b is not higher than the above-mentioned upper limit, the present composition can provide an article with higher alcohol repellency.

The ratio of units c to all the units constituting the polymer (A) is preferably from 15 to 39.5 mass %, more preferably from 18 to 37.3 mass %. When the ratio of units c is not lower than the above-mentioned lower limit, the conversion rate to the polymer (A) during the polymerization tends to be high. When the ratio of units c is not higher than the above-mentioned upper limit, the present composition can provide an article with higher oil and alcohol repellency.

When the units c comprise units based on the monomer c1, the ratio of units based on the monomer c1 to the sum of units a and units c is preferably from 20 to 40 mass %, more preferably from 22 to 38 mass %. When the ratio of units based on the monomer c1 is not lower than the above-mentioned lower limit, the conversion rate to the polymer (A) during the polymerization tends to be high. When the ratio of units based on the monomer c1 is not higher than the above-mentioned upper limit, the present composition can provide an article with higher oil and alcohol repellency.

When the units based on the monomer c1 comprise units based on a vinyl halide, the ratio of units based on the vinyl halide is preferably from 10 to 90 mass %, more preferably from 15 to 60 mass %, relative to units c.

The ratio of units based on the monomer c2 to the sum of units a and units c is preferably less than 20 mass %, more preferably less than 10 mass %, and may be 0 mass %. When the ratio of units based on the monomer c2 is not higher than the above-mentioned upper limit, an article with more alkali-resistant water, oil and alcohol repellency can be obtained.

In the polymer (A), the ratio of the sum of units a, units b and units c1 to all the units constituting the polymer (A) is preferably at least 80 mass %, more preferably at least 90 mass %, and may be 100 mass %. When the ratio is not lower than the above-mentioned lower limit, an article with more alkali-resistant water, oil and alcohol repellency can be obtained.

The ratios of the respective units can be determined by $^1$H-NMR or calculated from the reaction ratios of the respective monomers measured by gas chromatography. When the conversion rate of the monomer component to the polymer (A) during production of the polymer (A) is high (for example, at least 90%), the ratios of the respective units may be calculated from the feed amount of the monomer component.

The conversion rate is calculated from the theoretical mass of a polymer (A) calculated from the amounts of the raw materials used and the actual mass of the polymer (A), as the actual mass/theoretical mass×100.

The Mn of the polymer (A) is preferably at least 10,000, more preferably at least 11,000, further preferably at least 12,000. The Mn of the polymer (A) is preferably at most 100,000, more preferably at most 70,000, further preferably at most 50,000. When the Mn of the polymer (A) is not lower than the above-mentioned lower limit, the present composition can provide an article with higher water, oil and alcohol repellency. When the Mn of the polymer (A) is not higher than the above-mentioned upper limit, the polymer (A) is more dispersible in water.

The Mw of the polymer (A) is preferably at least 10,000, more preferably at least 20,000, further preferably at least 30,000. The Mw of the polymer (A) is preferably at most 150,000, more preferably at most 120,000, further preferably at most 100,000. When the Mw of the polymer (A) is not lower than the above-mentioned lower limit, the present composition can provide an article with higher water, oil and alcohol repellency. When the Mw of the polymer (A) is not higher than the above-mentioned upper limit, the polymer (A) is more dispersible in water.

The polymer (A) is preferably in the form of emulsion particles dispersed in an aqueous medium, which will be described later.

The emulsion particles of the polymer (A) preferably have an average particle diameter of from 20 to 200 nm, more preferably from 40 to 190 nm, further preferably from 60 to 180 nm. When the average particle diameter is not higher than the above-mentioned upper limit, the present composition can provide an article with higher water and alcohol repellency, and the polymer (A) disperses well as emulsion particles. When the average particle diameter is not lower than the above-mentioned lower limit, the emulsion particles of the polymer (A) are stabler under mechanical shear force.

(Aqueous Medium)

As the aqueous medium, water or water containing a water-miscible organic solvent may be mentioned.

A water-miscible organic solvent is an organic solvent which can be mixed with water in any ratio. The water-miscible organic solvent is preferably at least one species selected from the group consisting of alcohols (other than ether alcohols), ether alcohols and aprotic polar solvents. As the alcohols, t-butanol and propylene glycol may, for example, be mentioned. As the ether alcohols, 3-methoxymethylbutanol, dipropylene glycol, dipropylene glycol monomethyl ether and tripropylene glycol may, for example, be mentioned. As the aprotic polar solvents, N,N-dimethylformamide, dimethyl sulfoxide, tetrahydrofuran (hereinafter referred to as "THF"), acetonitrile, acetone, 3-methoxy-N, N-dimethylpropanamide, 3-butoxy-N,N-dimethylpropanamide, 3-methoxy-3-methyl-1-butanol, triethylene glycol dimethyl ether and tetraethylene glycol dimethyl ether may, for example, be mentioned. When the liquid medium is an aqueous medium, the water-miscible organic solvent is preferably an ether alcohol, more preferably dipropylene glycol, tripropylene glycol or dipropylene glycol monomethyl ether, because the resulting aqueous medium shows high compatibility with the polymer (A) and thereby facilitates formation of a uniform coating on an article.

When the aqueous medium is water containing a water-miscible organic solvent, the amount of the water-miscible organic solvent is preferably from 1 to 80 parts by mass, more preferably from 5 to 60 parts by mass, per 100 parts by mass of water.

(Additional Surfactant)

The additional surfactant is preferably a surfactant having no fluorine atoms.

The surfactant may be an anionic surfactant, a nonionic surfactant other than the monomer b, a cationic surfactant or an amphoteric surfactant.

Examples of nonionic surfactants other than the monomer b include surfactants $s^1$ to $s^6$ described in paragraphs [0067] to [0095] of JP-A-2009-215370.

As the surfactant $s^1$, a polyoxyethylene alkyl ether is preferred.

As the surfactant $s^2$, acetylene glycol ethylene oxide adduct is preferred. As the surfactant $s^3$, polyoxyethylene polyoxypropylene glycol is preferred.

Two or more nonionic surfactants other than the monomer b may be used in combination.

Examples of cationic surfactants include surfactant $s^7$ described in paragraphs [0096] to [0100] of JP-A-2009-215370.

The surfactant $s^7$ is preferably an ammonium salt having at least one alkyl group, alkenyl group or hydroxyl-terminated polyoxyalkylene chain on the nitrogen atom, instead of hydrogen atom(s), and is more preferably a compound $s^{71}$ represented by the following formula ($s^{71}$).

$$[(R^{21})_4N^+].X^-  \quad (s^{71})$$

wherein $R^{21}$ is a hydrogen atom, a $C_{1-22}$ alkyl group, a $C_{2-22}$ alkenyl group, a $C_{1-9}$ fluoroalkyl group or a hydroxy-terminated polyoxyalkylene chain, provided that not all of the four $R^{21}$'s, which may be the same or different, are hydrogen atoms, and $X^-$ is a counter ion.

$X^-$ is preferably a chloride ion, an ethyl sulfate ion or an acetate ion.

Examples of the compound $s^{71}$ include monostearyltrimethylammonium chloride, monostearyldimethylmonoethylammonium ethyl sulfate, mono(stearyl)monomethyldi(polyethylene glycol)ammonium chloride, monofluorohexyltrimethylammonium chloride, di(beef tallow alkyl)dimethylammonium chloride and dimethylmonococonutamine acetate.

Two or more cationic surfactants may be used in combination.

Examples of amphoteric surfactants include surfactant s8 described in paragraphs [0101] to [0102] of JP-A-2009-215370. A single species may be used, or two or more species may be used in combination.

The additional surfactant is preferably a cationic surfactant so that the polymer (A) forms emulsion particles having smaller average particle diameter. A cationic surfactant may be used in combination with another surfactant.

(Additional Component)

Examples of additional components include a fluorinated polymer other than the polymer (A), a fluorine-free polymer, a fluorine-free water/oil repellent, a water soluble polymer resin (such as hydrophilic polyesters and their derivatives, hydrophilic polyethylene glycols and their derivatives, and hydrophilic polyamines and their derivatives), a crosslinking agent, a penetrant (such as nonionic surfactants having a symmetric structure having an acetylene group at the center such as DISPANOL (registered trademark) series manufactured by NOF CORPORATION), colloidal silica (such as SNOWTEX (registered trademark) series manufactured by Nissan Chemical Corporation or ADELITE series manufactured by ADEKA CORPORATION), a defoamer (such as OLFINE (registered trademark) series manufactured by Nissin Chemical Industry Co., Ltd. and FS Antifoam series manufactured by Dow Corning Toray Co., Ltd.), a film-forming assistant, a mothproofing agent, a mildewproofing agent, an antiseptic agent, a flame retardant, an antistatic agent (such as Delectol series manufactured by Meisei Chemical Works, Ltd.), an anticrease agent, a softener (such as a silicone emulsion or a polyethylene wax emulsion) and a pH adjustor (such as diethanolamine, triethanolamine, acetic acid or citric acid).

Incorporation of a crosslinking agent into the present composition tends to improve the adhesion to an article.

The crosslinking agent is preferably an isocyanate crosslinking agent, a methylol crosslinking agent, a carbodiimide crosslinking agent or an oxazoline crosslinking agent.

As the isocyanate crosslinking agents, for example, blocked type aromatic isocyanate crosslinking agents, blocked type aliphatic isocyanate crosslinking agents, non-blocked type aromatic isocyanate crosslinking agents and non-blocked type aliphatic isocyanate crosslinking agents may be mentioned. Isocyanate crosslinking agents which are in the form of an aqueous dispersion containing a surfactant as an emulsifier or inherently water-dispersible isocyanate crosslinking agents having a hydrophilic group are preferred.

As the methylol crosslinking agent, condensates or precondensates of urea or melamine with formaldehyde, methylol-dihydroxyethylene-urea and derivatives thereof, methylol-ethylene-urea, methylol-propylene-urea, methylol-triazone, dicyandiamide-formaldehyde condensates and methylol-carbamate, methylol-(meth)acrylamide, and polymers thereof may, for example, be mentioned.

Carbodiimide crosslinking agents are polymers having a carbodiimide group in the molecule and are highly reactive with carboxy groups, amino groups, active hydrogen groups on an article or the like.

Oxazoline crosslinking agents are polymers having an oxazoline group in the molecule and are highly reactive with carboxy groups on an article or the like.

As other crosslinking agents, for examples, divinyl sulfone, polyamides and their cationic derivatives, polyamines and their cationic derivatives, epoxy derivatives such as diglycidyl glycerol and halide derivatives such as (epoxy-2,3-propyl)trimethylammonium chloride and N-methyl-N-(epoxy-2,3-propyl)morpholinium chloride, ethylene glycol chloromethyl ether pyridinium salt, polyamine-polyimide-epichlorohydrin resins, polyvinyl alcohol and its derivatives, polyacrylamide and its derivatives, glyoxal resin type anticrease agents may be mentioned.

When the present composition contains a methylol crosslinking agent or a glyoxal resin type anticrease agent, it is preferred to incorporate a catalyst in the composition as an additive. The catalyst may, for example, be an inorganic amine or an organic amine. The inorganic amine may, for example, be ammonium chloride. The organic amine may, for example, be an amino alcohol hydrochloride or semicarbazide hydrochloride. The amino alcohol hydrochloride may, for example, be monoethanolamine hydrochloride, diethanolamine hydrochloride, triethanolamine hydrochloride or 2-amino-2-methylpropanol hydrochloride.

(Ratios of Respective Components)

The content of the aqueous medium may be selected appropriately depending on the desired solid content.

The solid content of the present composition immediately after production of the composition is preferably from 20 to 70 mass %, more preferably from 30 to 60 mass %.

The solid content of the present composition at the time of treatment of an article is preferably from 0.1 to 7 mass %, more preferably from 0.2 to 5 mass %.

The content of the additional surfactant in the present composition is preferably at most 5 parts by mass per 100 parts by mass of the polymer (A), and may be 0 part by mass. When the content of the additional surfactant is not higher than the above-mentioned upper limit, it is possible to reduce the adverse effect of surfactants on the water, oil and alcohol repellency of an article treated with the present composition.

In the present composition, the ratio of the sum of units b and the additional surfactant immediately after production of the present composition is preferably from 1 to 6 parts by mass relative to 100 parts by mass in total of units a and units c. The ratio of the sum of units b and the additional surfactant is not lower than the above-mentioned lower limit, the present composition shows good dispersion stability. When the ratio of the sum of units b and the additional surfactant is not higher than the above-mentioned upper limit, the content of the additional surfactant in the present composition is likely to be kept to the above-mentioned preferred upper limit or below.

The ratio of the cationic surfactant in the present composition is preferably at most 50 parts by mass, more preferably at most 30 parts by mass relative to 100 parts by mass in total of units b and the cationic surfactant for higher alcohol repellency.

The ratio of the cationic surfactant in the present composition is preferably at least 5 parts by mass, more preferably at least 10 parts by mass relative to 100 parts by mass in total of units b and the cationic surfactant so that the polymer (A) disperses well in water forming emulsion particles with a small average diameter, though it may be 0 part by mass.

The content of a crosslinking agent in the present composition is preferably from 1 to 50 parts by mass per 100 parts by mass of the polymer (A) at the time of treatment of an article.

(Mechanism)

As described above, because the polymer (A) comprises units a, the present composition can provide an article having alkali-resistant water, oil and alcohol repellency.

Because the polymer (A) comprises units b, the present composition can provide an article having high alcohol and water repellency.

[Method for Producing Liquid Repellent Composition]

The present composition can be produced by a method for producing a liquid repellent composition comprising a fluorinated polymer which comprises polymerizing a monomer component in an emulsion comprising an aqueous medium, the monomer component and a polymerization initiator. According to the method, the polymer (A) is obtained with a high conversion rate of the monomer component to the polymer (A) and a high number average molecular weight.

The emulsion may comprise an additional surfactant, if necessary.

The monomer component comprises a monomer a, a monomer b and a monomer c.

The ratio of the monomer b to the sum of the monomer a and the monomer c is preferably from 0.5 to 5 mass %, more preferably from 0.6 to 4 mass %. When the ratio of the monomer b is not lower than the above-mentioned lower limit, the polymer (A) shows good dispersibility in an emulsion, forming emulsion particles with a proper average diameter. When the ratio of the monomer b is not higher than the above-mentioned upper limit, the present composition can provide an article with higher alcohol repellency.

The ratio of the monomer a to the sum of the monomer a and the monomer c is preferably from 60 to 80 mass %, more preferably from 62 to 78 mass %. When the ratio of the monomer a is not lower than the above-mentioned lower limit, the present composition can provide an article with higher oil and alcohol repellency. When the ratio of the monomer a is not higher than the above-mentioned upper limit, the conversion rate to the polymer (A) during the polymerization tends to be high.

The ratio of the monomer a to the monomer component is preferably from 57 to 80 mass %, more preferably from 60 to 80 mass %, further preferably from 62 to 78 mass %.

The lower limit for the ratio of the monomer a is preferably 57 mass %, more preferably 60 mass %, further preferably 62 mass %. When the ratio of the monomer a is not lower than the above-mentioned lower limit, the present composition can provide an article with higher oil and alcohol repellency. The upper limit for the ratio of the monomer a is preferably 80 mass %, more preferably 78 mass %. When the ratio of the monomer a is not higher than the above-mentioned upper limit, the conversion rate to the polymer (A) during the polymerization tends to be high.

The ratio of the monomer b to the monomer composition is preferably from 0.5 to 5 mass %, more preferably from 0.7 to 4 mass %. The lower limit for the ratio of the monomer b is preferably 0.48 mass %, more preferably 0.5 mass %, further preferably 0.7 mass %. When the ratio of the monomer b is not lower than the above-mentioned lower limit, the polymer (A) shows good dispersibility in an emulsion, forming emulsion particles with a proper average diameter. The upper limit for the ratio of the monomer b is preferably 5 mass %, more preferably 4.98 mass %, further preferably 4 mass %. When the ratio of the monomer b is not higher than the above-mentioned upper limit, the present composition can provide an article with higher alcohol repellency.

The ratio of the monomer c to the monomer component (A) is preferably from 15 to 39.5 mass %, more preferably from 18 to 37.3 mass %. When the ratio of the monomer c is not lower than the above-mentioned lower limit, the conversion rate to the polymer (A) during the polymerization tends to be high. When the ratio of the monomer c is not higher than the above-mentioned upper limit, the present composition can provide an article with higher oil and alcohol repellency.

When the monomer c comprise the monomer c1, the ratio of the monomer c1 to the sum of the monomer a and the monomer c is preferably from 20 to 40 mass %, more preferably from 22 to 38 mass %. When the ratio of the monomer c1 is not lower than the above-mentioned lower limit, the conversion rate to the polymer (A) during the polymerization tends to be high. When the ratio of the monomer c1 is not higher than the above-mentioned upper limit, the present composition can provide an article with higher oil and alcohol repellency.

When the monomer c1 comprise a vinyl halide, the ratio of the vinyl halide to the monomer c is preferably from 10 to 90 mass %, more preferably from 15 to 60 mass %.

The ratio of the monomer c2 to the sum of the monomer a and the monomer c is preferably less than 20 mass %, more preferably less than 10 mass %, and may be 0 mass %. When the ratio of the monomer c2 is not higher than the above-mentioned upper limit, an article with more alkali-resistant water, oil and alcohol repellency can be obtained.

The ratio of the sum of the monomer a, the monomer b and the monomer c1 to the monomer component is preferably at least 80 mass %, more preferably at least 90 mass %, and may be 100 mass %. When the ratio is not lower than the above-mentioned lower limit, an article with more alkali-resistant water, oil and alcohol repellency can be obtained.

The polymerization initiator may, for example, be a thermal polymerization initiator, a photopolymerization initiator, a radiation polymerization initiator, a radical polymerization initiator or an ionic polymerization initiator, and is preferably a radical polymerization initiator. As the radical polymerization initiator, for example, an azo type polymerization initiator, a peroxide type polymerization initiator or a redox type initiator is employed depending upon the polymerization temperature. As the radical polymerization initiator, preferred is an azo type compound, and more preferred is a salt of an azo type compound. The polymerization temperature is preferably from 20 to 150° C.

The amount of the polymerization initiator is preferably from 0.1 to 5 parts by mass, more preferably from 0.1 to 3 parts by mass, per 100 parts by mass of the monomer component.

At the time of polymerization of a monomer component, a molecular weight-controlling agent may be employed. The molecular weight-controlling agent is preferably an aromatic compound, a mercaptoalcohol, a mercaptocarboxylic acid or an alkyl mercaptan, more preferably a mercaptocarboxylic acid or an alkyl mercaptan. Examples of the molecular weight-controlling agent include mercaptoethanol, mercaptopropionic acid, n-octyl mercaptan, n-dodecyl mercaptan, tert-dodecyl mercaptan, stearyl mercaptan and α-methylstyrene dimer $(CH_2=C(Ph)CH_2C(CH_3)_2Ph$ wherein Ph is a phenyl group).

The amount of the molecular weight-controlling agent is preferably at most 5 parts by mass, more preferably at most 2 parts by mass, per 100 parts by mass of the monomer component, and may be 0 parts by mass.

The emulsion may be prepared, for example, by emulsifying a mixture comprising an aqueous medium and a monomer component, and, if necessary, an additional surfactant in a homogenizer, a high-pressure emulsifying machine or the like and adding a polymerization initiator.

The concentration of the monomer component in the emulsion is preferably from 20 to 60 mass %, more preferably from 30 to 50 mass %. When the concentration of the monomer component in the emulsion is within the above-mentioned range, the monomer component polymerizes into a polymer (A) having a sufficiently high molecular weight with a high conversion rate.

The amount of the additional surfactant in the emulsion is preferably at most 6 parts by mass per 100 parts by mass of the monomer component, and may be 0 parts by mass. When the amount of the additional surfactant is not higher than the above-mentioned upper limit, it is possible to reduce the adverse effect of the additional surfactant on the water, oil and alcohol repellency of an article treated with the present composition.

In the emulsion, the ratio of the sum of the monomer b and the additional surfactant is preferably from 1 to 6 parts by mass, relative to 100 parts by mass in total of the monomer a and the monomer c. When the ratio of the sum of the monomer b and the additional surfactant is not lower than the above-mentioned lower limit, the emulsion shows good dispersion stability. When ratio of the sum of the monomer b and the additional surfactant is not higher than the above-mentioned upper limit, the content of the additional surfactant in the present composition is likely to be kept to the above-mentioned preferred upper limit or below.

In the emulsion, the ratio of a cationic surfactant is preferably at most 50 parts by mass, more preferably at most 30 parts by mass, relative to 100 parts by mass in total of the monomer b and the cationic surfactant for higher alcohol repellency.

The ratio of a cationic surfactant is preferably at least 5 parts by mass, more preferably at least 10 parts by mass relative to 100 parts by mass in total of the monomer b and the cationic surfactant so that the polymer (A) disperses well in water forming emulsion particles with a small average diameter, though it may be 0 part by mass.

The dispersion of the polymer (A) obtained by polymerizing a monomer component in an emulsion may be used as the present composition, by itself or after diluted with an aqueous medium to a certain solid content. Additional components may be added to the present composition.

The conversion rate of the monomer component to the polymer (A) at completion of the polymerization is preferably at least 80%, more preferably at least 90%. As the conversion rate increases, the molecular weight of the polymer (A) increases, and water and oil repellency and alcohol repellency improve. Because a high conversion rate leads to less damage to polymer performance by remaining monomers and a higher fluorine content of the polymer (A), water and oil repellency and alcohol repellency improve.

It is preferred to optimize the composition of the emulsion and the polymerization time so that a conversion rate of 80% or higher is achieved.

(Mechanism)

Because a monomer composition comprising a monomer a is polymerized in the above-mentioned method for producing the present composition, the method can produce the present composition which can impart alkali-resistant water, oil and alcohol repellency to an article.

Because the monomer composition is polymerized in an emulsion in the method for producing the present composition, the polymer (A) is produced with a high molecular weight, and hence, the present composition can impart high water, oil and alcohol repellency to an article.

Because the monomer component comprises a monomer b in the method for producing the present composition, the present composition can impart high alcohol and water repellency to an article.

[Article]

The article of the present invention is obtained by treating an article with the present composition.

The article to be treated with the present composition may, for example, be fibers, fabrics (woven fabric, knitted fabric, nonwoven fabric, raised fabric, etc.), textile products using fabrics (clothing such as ski wear, rainwear, coats, jumpers, windbreakers, down jackets, sportswear, workwear, uniforms and protective suits, rucksacks, backpacks, bags, tents, pup tents, etc.), glass, paper, wood, leather, artificial leather, stone, concrete, ceramics, metals, metal oxides, molded resin products, porous resin products and fibrous porous bodies. Porous resin products include, for example, those used as filters. As the materials for porous resin products, polypropylene, polyethylene terephthalate and polytetrafluoroethylene may, for example, be mentioned. As the materials for fibrous porous bodies, glass fibers, cellulose nanofibers, carbon fibers and cellulose acetate may, for example, be mentioned.

The article to be treated is preferably fiber, a fabric or a textile product using a fabric.

The fibers in it may, for example, be natural fibers such as cotton, wool, silk or cellulose, synthetic fibers such as polyester, polyamide, acrylic or aramid, chemical fibers such as rayon, viscose rayon or lyocell, mixed fibers consisting of natural and synthetic fibers, or mixed fibers consisting of natural and chemical fibers without any particular restrictions. When the article to be treated is a nonwoven fabric, the fibers in it may, for example, be polyethylene, polypropylene, polyolefin, polyethylene terephthalate, polytetrafluoroethylene, glass and rayon fibers.

An article may be treated by any method, as long as the liquid repellent composition adheres to the article, and when the present composition comprises a liquid medium, the present composition may be applied to an article by a known coating method such as coating, impregnation, dipping, spraying, brushing, padding, size press and roll coating and then dried. For treatment of a paper substrate, the present composition can be used by coating or impregnating a paper substrate with the present composition (external addition process) or by forming a pulp slurry comprising the present composition into a paper sheet (internal addition process).

The liquid repellent composition may be applied in any amount without any particular restrictions, but, in the case of a fabric, it is applied preferably in an amount of from 0.001 to 0.05 g/g, per unit mass of the fabric, on a solid basis.

The drying may be carried out at ordinary temperature or by heating, preferably by heating. In the case of heating, the heating temperature is preferably from 40 to 200° C. When the liquid repellent composition comprises a crosslinking agent, it is preferred to cure the composition by heating to the crosslinking temperature of the crosslinking agent or above, if necessary.

(Mechanism)

The article of the present invention described above shows alkali-resistant water, oil and alcohol repellency because it is treated with the present composition comprising the polymer (A) comprising units a.

The article of the present invention shows high alcohol and water repellency because it is treated with the present composition comprising the polymer (A) comprising units b.

EXAMPLES

Now, the present invention will be described in further detail with reference to Examples. However, it should be understood that the present invention is by no means restricted thereto. Examples 1 to 8 are Examples of the present invention, and Examples 9 to 12 are Comparative Examples.

(Ratios of Units)

The ratios of the respective units relative to all the units in the fluorinated polymer (polymer composition) were calculated by analyzing the fluorinated polymer dispersion obtained in each Example by $^1$H-NMR after removal of the additional surfactant and the solvent, and calculated from the reaction ratio of each monomer determined by gas chromatography of the fluorinated polymer dispersion obtained in each Example.

(Average Molecular Weight)

<Recovery of Fluorinated Polymer>

6 g of a fluorinated polymer dispersion obtained in each Example was added dropwise to 60 g of a mixture of 6 g of hexane and 54 g of 2-butanol under stirring to precipitate a solid. The mixture was centrifuged at 3000 rpm for 5 minutes, and the solid was separated, then stirred well with 30 g of alcohol denatured with isopropyl alcohol (product name: 95% alcohol denatured with IPA, manufactured by Imazu Chemical Co. Ltd.) and 30 g of ion-exchanged water, and centrifuged at 3000 rpm for 5 minutes. The solid was separated from the supernatant and dried in a vacuum at 35° C. overnight to obtain the fluorinated polymer.

<Measurement of Mn and Mw>

The recovered fluorinated polymer was dissolved in a mixed medium comprising a fluorine-containing medium (manufactured by AGC Inc. under the product name of AK-225)/tetrahydrofuran (hereinafter referred to as "THF") in a volume ratio of 6/4 to make a solution with a solid content of 0.5 mass %, and the solution was passed through a 0.2 μm filter to prepare an analytical sample. The Mn and Mw were measured by GPC of the analytical sample under the following conditions.

Instrument: HLC-8320GPC manufactured by Tosoh Corporation,

Column: MIXED-C manufactured by Polymer laboratories, having a length of 300 mm, an inner diameter of 7.5 mm and a wall thickness of 5 μm, Mobile phase: AK-225/THF=6/4 (volume ratio), Flow rate: 1.0 mL/min, Oven temperature: 37° C., Sample concentration: 1.0 mass %, Injection volume: 50 μL, Detector: RI, and Standard sample: polymethyl methacrylate (Mp=2,136,000, 955,000, 569,000, 332,800, 121,600, 67,400, 31,110, 13,300, 7,360, 1,950, 1,010, and 550).

(Water Contact Angle)

In accordance with JIS R3257: 1999 "Testing method of wettability of glass substrate", water droplets were placed at five points on the surface of an article, and the static water contact angle of each droplet was measured. The measurements were carried out at 20° C. with water droplets of about 2 μL/droplet. The water contact angles at the five points were averaged. The water contact angle is a measure of the water repellency of an article.

(IPA Contact Angle)

In accordance with JIS R3257: 1999 "Testing method of wettability of glass substrate", droplets of 80 mass % IPA in water were placed at five points on the surface of an article, and the static IPA contact angle of each droplet was measured. The measurements were carried out at 20° C. with water droplets of about 2 μL/droplet. The IPA contact angles at the five points were averaged. The contact angle of 80 mass % IPA in water is a measure of the alcohol repellency of an article.
(Monomer a)
C6OLF: $CH_2=CH-CF_2CF_2CF_2CF_2CF_2CF_3$ (manufactured by Tokyo Chemical Industry Co., Ltd.).
(Monomer b)
PD430: a compound represented by the following formula (3) (LATEMUL PD-430 manufactured by Kao Corporation, HLB 14.4).
PD450: a compound represented by the following formula (3) (LATEMUL PD-450 manufactured by Kao Corporation, HLB 16.2).

$$CH_2=C(CH_3)-CH_2CH_2O-[(A^1O)_{m1}(A^2O)_{m2}]-H \quad (3)$$

wherein $A^1O$ and $A^2O$ are oxyalkylene groups which are different from each other, and m1+m2 is an integer of from 3 to 30. $A^1O$ and $A^2O$ are an oxybutylene group and an oxyalkylene group, respectively.
(Monomer c)
AcV: vinyl acetate (manufactured by Tokyo Chemical Industry Co., Ltd.).
PiV: vinyl pivalate (manufactured by Tokyo Chemical Industry Co., Ltd.).
StV: vinyl stearate (manufactured by Tokyo Chemical Industry Co., Ltd.).
VCM: $CH_2=CHCl$ (manufactured by Yokohama Chemical Co., ltd.).
(Additional Surfactant)
<Cationic Surfactant>
LC18-63: 63 mass % solution of C16-18 alkyltrimethylammonium chloride in water and isopropyl alcohol (LIPOQUAD 18-63 manufactured by of Lion Specialty Chemicals Co., Ltd.)
<Nonionic Surfactants>
E120: 10 mass % aqueous solution of polyoxyethylene lauryl ether (adduct with about 12 moles of ethylene oxide, PEL-12, EMULGEN 120 manufactured by Kao Corporation).
E430: 10 mass % aqueous solution of polyoxyethylene oleyl ether (adduct with about 30 moles of ethylene oxide, PEO-30, EMULGEN 430, manufactured by Kao Corporation)
P104: ethylene oxide-propylene oxide polymer (average molecular weight: 1670, containing 40 mass % of oxyethylene, Pronon #104 manufactured by NOF Corporation).

P204: ethylene oxide-propylene oxide polymer (average molecular weight: 3330, containing 40 mass % of oxyethylene, Pronon #204 manufactured by NOF Corporation).
(Media)
Water: ion-exchanged water
DPG: dipropylene glycol
(Polymerization Initiator)
VA-061A: 20 mass % aqueous solution of the acetate of 2,2'-azobis[2-(2-imidazolin-2-yl)propane] (VA-061, manufactured by FUJIFILM Wako Pure Chemical Corporation) (VA-061:acetic acid=1:0.8 (mass ratio))

EXAMPLES 1 to 12

Into a 1 L autoclave equipped with a stirrer, the monomers other than AcV and VCM, media and fluorine-free surfactants shown in Table 1 were put in the amounts shown in Table 1 and stirred to obtain a liquid mixture. The resulting liquid mixture was emulsified with a high-pressure emulsifier preliminarily under 10 MPa and then under 40 MPa to obtain an emulsion.

The emulsion was transferred into a stainless steel autoclave, and the polymerization initiator was added in the amounts shown in Table 1. After the autoclave was purged with nitrogen five times at 0.5 MPa, AcV and VCM were added, and after heating to 45° C., the monomer component was polymerized for 72 hours to obtain a fluorinated copolymer dispersion. The solid content of the dispersion and the Mn and the average particle diameter of the fluorinated polymer in the dispersion are shown in Table 1. The amounts (g) of surfactants and polymerization initiator in Table 1 include the media in them.

The fluorinated copolymer dispersion was diluted with distilled water to a solid content of 1.0 mass % to obtain a liquid repellent composition.

A glass substrate (ASLAB, SUPER GRADE MICROSCOPE SLIDES; manufactured by THICK, 25 mm long, 75 mm wide and 1.0-1.2 mm thick) was coated with the liquid repellent composition by means of a dip coater (model: F255 manufactured by ASUMI GIKEN, Limited) by reciprocally moving it three times at a rate of 0.5 mm/s, and then dried at 200° C. for 10 minutes to obtain a test article. The water contact angle and the IPA contact angle of the article were measured. The results are shown in Table 1.

TABLE 1

|  |  |  | Ex. 1 | Ex. 2 | Ex. 3 | Ex. 4 | Ex. 5 | Ex. 6 | Ex. 7 |
|---|---|---|---|---|---|---|---|---|---|
| Amount [g] | Monomer a | C60LF | 76.0 | 76.0 | 76.0 | 76.0 | 76.0 | 72.5 | 69.0 |
|  | Monomer c | AcV | 24.0 | 24.0 | 24.0 | 24.0 | 24.0 | 24.2 | 23.5 |
|  |  | PiV | — | — | — | — | — | 3.3 | — |
|  |  | StV | — | — | — | — | — | — | 7.5 |
|  |  | VCM | — | — | — | — | — | — | — |
|  | Monomer b | PD430 | 2.25 | 1.50 | 1.25 | — | — | 1.25 | 1.25 |
|  |  | PD450 | — | — | — | 1.50 | 1.25 | — | — |
|  | Surfactant | LC18-63 | — | — | 0.40 | — | 0.40 | 0.40 | 0.40 |
|  |  | E120 | — | — | — | — | — | — | — |
|  |  | E430 | — | — | — | — | — | — | — |
|  |  | P204 | — | — | — | — | — | — | — |
|  |  | P104 | — | — | — | — | — | — | — |
|  | Medium | Water | 78.5 | 78.5 | 78.5 | 78.5 | 78.5 | 78.5 | 78.5 |
|  |  | DPG | 20.0 | 20.0 | 20.0 | 20.0 | 20.0 | 20.0 | 20.0 |
|  | Polymerization Initiator | VA-061 | 5.0 | 5.0 | 5.0 | 5.0 | 5.0 | 5.0 | 5.0 |

TABLE 1-continued

| | | | | | | | | |
|---|---|---|---|---|---|---|---|---|
| Dispersion Fluorinated polymer | Solid content [mass %] | | 46.5 | 45.4 | 45.7 | 46.0 | 45.8 | 47.1 | 45.2 |
| | Mn | | 18000 | 19000 | 18500 | 19000 | 18900 | 19200 | 20000 |
| | Average particle diameter [nm] | | 110 | 170 | 105 | 150 | 110 | 115 | 130 |
| | Polymer composition [mass %] | units a | 74.3 | 74.9 | 75.1 | 74.9 | 75.1 | 71.6 | 68.1 |
| | | units b | 2.2 | 1.5 | 1.2 | 1.5 | 1.2 | 1.2 | 1.2 |
| | | units c | 23.5 | 23.6 | 23.7 | 23.6 | 23.7 | 27.2 | 30.6 |
| | Ratio to units a + units c [mass %] | units a | 76.0 | 76.0 | 76.0 | 76.0 | 76.0 | 72.5 | 69.0 |
| | | units b | 2.3 | 1.5 | 1.3 | 1.5 | 1.3 | 1.3 | 1.3 |
| Article | Contact angle [°] | Water | 108 | 109 | 108 | 109 | 108 | 110 | 113 |
| | | IPA | 49 | 50 | 49 | 50 | 49 | 51 | 55 |

| | | | | Ex. 8 | Ex. 9 | Ex. 10 | Ex. 11 | Ex. 12 |
|---|---|---|---|---|---|---|---|---|
| | Amount [g] | Monomer a | C60LF | 74.7 | 76.0 | 76.0 | 76.0 | 76.0 |
| | | Monomer c | AcV | 18.7 | 24.0 | 24.0 | 24.0 | 24.0 |
| | | | PiV | — | — | — | — | — |
| | | | StV | — | — | — | — | — |
| | | | VCM | 6.6 | — | — | — | — |
| | | Monomer b | PD430 | 1.25 | — | — | — | — |
| | | | PD450 | — | — | — | — | — |
| | | Surfactant | LC18-63 | 0.40 | — | — | 0.40 | 0.40 |
| | | | E120 | — | 7.50 | — | 7.50 | — |
| | | | E430 | — | — | 7.50 | — | 7.50 |
| | | | P204 | — | — | 0.50 | — | 0.50 |
| | | | P104 | — | 0.50 | — | 0.50 | — |
| | | Medium | Water | 78.5 | 78.1 | 78.1 | 78.1 | 78.1 |
| | | | DPG | 20.0 | 20.0 | 20.0 | 20.0 | 20.0 |
| | | Polymerization Initiator | VA-061 | 5.0 | 5.0 | 5.0 | 5.0 | 5.0 |
| Dispersion Fluorinated polymer | Solid content [mass %] | | | 44.9 | 46.1 | 46.2 | 45.4 | 45.2 |
| | Mn | | | 18500 | 21000 | 19500 | 19900 | 20100 |
| | Average particle diameter [nm] | | | 110 | 210 | 220 | 120 | 115 |
| | Polymer composition [mass %] | units a | | 73.8 | 76.0 | 76.0 | 76.0 | 76.0 |
| | | units b | | 1.2 | — | — | — | — |
| | | units c | | 25.0 | 24.0 | 24.0 | 24.0 | 24.0 |
| | Ratio to units a + units c [mass %] | units a | | 74.7 | 76.0 | 76.0 | 76.0 | 76.0 |
| | | units b | | 1.3 | — | — | — | — |
| Article | Contact angle [°] | Water | | 111 | 101 | 100 | 98 | 98 |
| | | IPA | | 53 | 42 | 42 | 40 | 40 |

The articles of Examples 1 to 8 treated with compositions comprising fluorinated polymers comprising units a, units b and units c showed good water and alcohol repellency regardless of the presence of a cationic surfactant in the compositions.

In Examples 9 to 12, because the fluorinated polymers polymerized using a nonionic surfactant having no polymerizable carbon-carbon double bonds instead of monomer b comprised no units b, the articles showed insufficient water and alcohol repellency, especially the alcohol repellency was poor when the compositions comprised a cationic surfactant.

This application is a continuation of PCT Application No. PCT/JP2020/038488, filed on Oct. 12, 2020, which is based upon and claims the benefit of priority from Japanese Patent Application No. 2019-193655 filed on Oct. 24, 2019. The contents of those applications are incorporated herein by reference in their entireties.

What is claimed is:

1. A liquid repellent composition, comprising:
a fluorinated polymer; and
an aqueous medium,
wherein the fluorinated polymer comprises as copolymerized units:
a monomer of formula (1):

  (1)

wherein $R^f$ is a $C_{1-8}$ perfluoroalkyl group,
a monomer of formula (2):

  (2)

wherein $R^1$ is a hydrogen atom or a methyl group, $R^2$ is a $C_{1-6}$ alkylene group, and $R^3$ is a bivalent group having a polyoxyalkylene chain having a carbon atom bonded to $CH_2=CR^1-R^2-O-$, and
a monomer different from and copolymerizable with the monomer of formula (1) and the monomer of formula (2) a and the monomer b.

2. The composition according to claim 1, wherein a mass ratio of the copolymerized units of the monomer of formula (2) to the sum of the copolymerized units of the monomer of formula (1) and the copolymerized units of the monomer different from the monomer of formula (1) and the monomer of formula (2) is from 0.5 to 5 mass %.

3. The composition according to claim 1, wherein a mass ratio of copolymerized units of the monomer of formula (1) to the sum of the copolymerized units of the monomer of formula (1) and the copolymerized units of the monomer different from the monomer of formula (1) and the monomer of formula (2) is from 60 to 80 mass %.

4. The composition according to claim 1, wherein $R^f$ is a $C_{1-6}$ perfluoroalkyl group.

5. The composition according to claim 1, wherein the monomer different from the monomer of formula (1) and the monomer of formula (2) comprises a compound of formula $CH_2=CH-Q$ or formula $CH_2=CHCH_2-Q$ wherein Q is a halogen atom or an organic group having an oxygen, nitrogen or sulfur atom bonded to the CH— or $CH_2-$.

6. The composition according to claim 1, wherein a number average molecular weight of the fluorinated polymer is from 10,000 to 100,000.

7. The composition according to claim 1, wherein the fluorinated polymer is dispersed in the aqueous medium as emulsion particles.

8. The composition according to claim 7, wherein an average particle diameter of the emulsion particles of the fluorinated polymer is from 20 to 200 nm.

9. The composition according to claim 1, further comprising a cationic surfactant.

10. A method for producing a composition according to claim 1, comprising:

preparing in an aqueous medium of an emulsion comprising:

a monomer of formula (1);

$$CH_2=CH-R^f \quad (1)$$

wherein $R^f$ is a $C_{1-8}$ perfluoroalkyl group, a monomer of formula (2):

$$CH_2=CR^1-R^2-O-R^3-H \quad (2)$$

wherein $R^1$ is a hydrogen atom or a methyl group, $R^2$ is a $C_{1-6}$ alkylene group, and $R^3$ is a bivalent group having a polyoxvalkylene chain having a carbon atom bonded to $CH_2=CR^1-R^2-O-$, a monomer different from and copolymerizable with the monomer of formula (1) and the monomer of formula (2), and a polymerization initiator; and polymerizing the monomer of formula (1), the monomer of formula (2) and the monomer different from the monomer of formula (1) and the monomer of formula (2) to obtain the composition.

11. An article treated with the composition of claim 1.

* * * * *